March 10, 1964
G. H. MILLAR
3,123,900
METHOD OF MANUFACTURE OF A FLOW ELEMENT OR PULSATION DAMPENER
Filed July 29, 1959
2 Sheets-Sheet 1
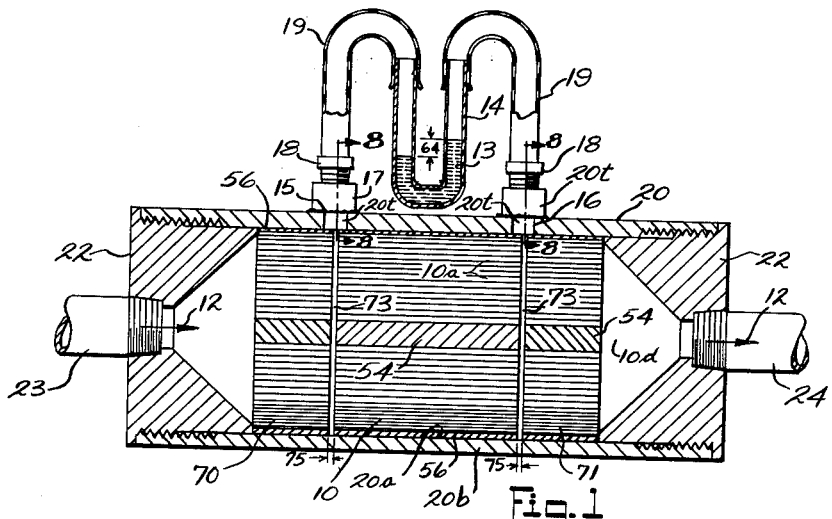
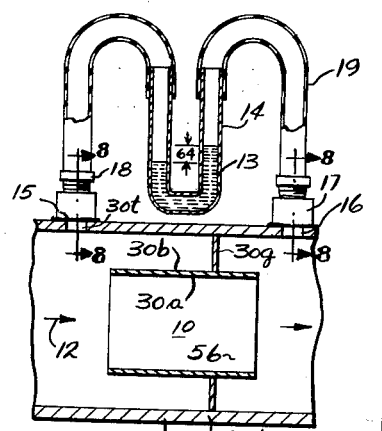
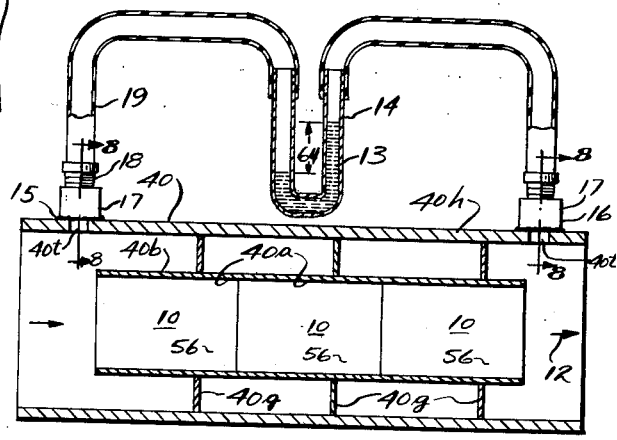
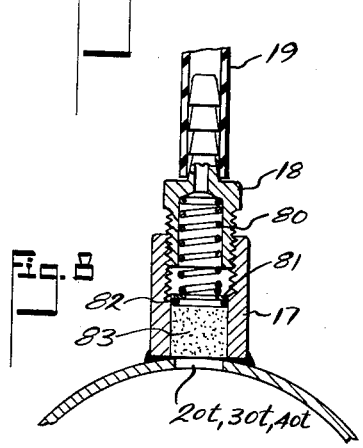
INVENTOR.
GORDON H. MILLAR
BY
Mayer, Baldwin, Doran & Young
ATTORNEYS March 10, 1964 G. H. MILLAR 3,123,900
METHOD OF MANUFACTURE OF A FLOW ELEMENT OR PULSATION DAMPENER
Filed July 29, 1959 2 Sheets-Sheet 2
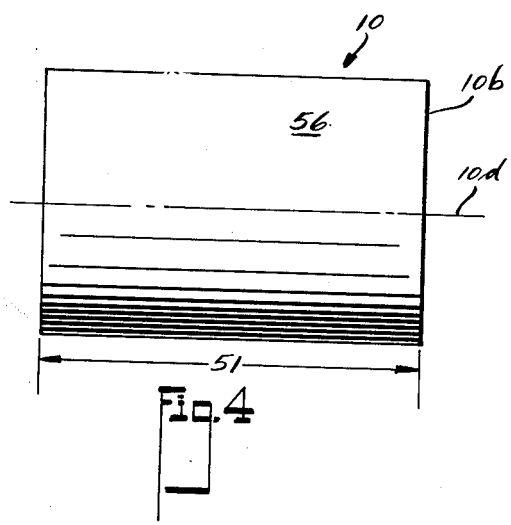
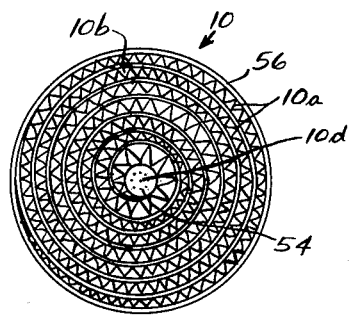
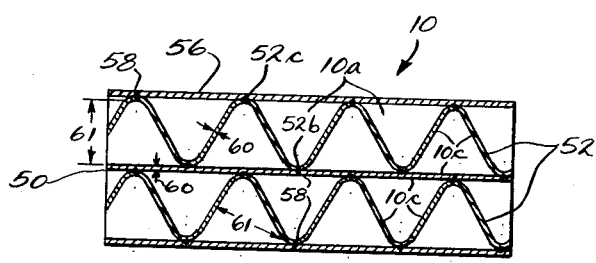
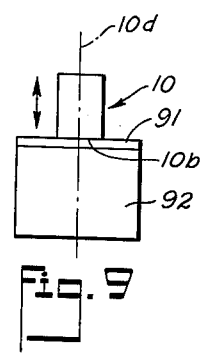
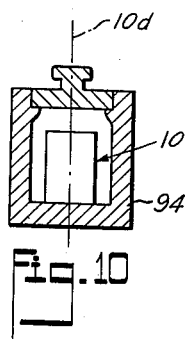
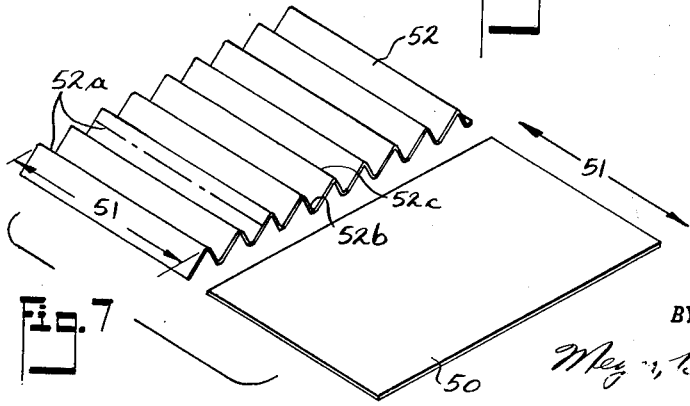
INVENTOR.
GORDON H. MILLAR
BY
ATTORNEYS

United States Patent Office 3,123,900
Patented Mar. 10, 1964

3,123,900
METHOD OF MANUFACTURE OF A FLOW ELEMENT OR PULSATION DAMPENER
Gordon H. Millar, Lakewood, Ohio, assignor to The Meriam Instruments Co., Cleveland, Ohio, a corporation of Ohio
Filed July 29, 1959, Ser. No. 830,241
4 Claims. (Cl. 29—157)

This invention relates to improvements in a method of making an instrument for measuring a characteristic of a flowing fluid, a flow metering element and/or pulsation dampener for said instrument, and/or method of manufacture of said flow element, and relates more particularly to a structure wherein this flow element is constructed to provide the advantages of laminar flow.

An object of the present invention is to provide a method of making an instrument for measuring a characteristic of a flowing fluid, or an element used in said instrument, wherein the element is characterized by the linear relationship it provides between the differential pressure thereacross and the volume or velocity of fluid flow therethrough, its large range of flow operation, mechanical rigidity, geometric integrity of form, constant calibration for instrument accuracy, assurance of laminar flow, locking of its components against relative movement during handling, uniform size of all its flow passageways, unobstructed condition of its flow passageways, thin wall portions forming the flow passageways so that the element has maximum porosity, accuracy with pulsating flow, calibration unaffected by absolute pressure of the flowing fluid, calibration affected in a predictable way by temperature change in the flowing fluid, and/or easy to clean construction.

A further object of the present invention is to provide a method of making a flow element adapted to be arranged in modular construction in either series or parallel arrangement.

A further object of the present invention is to provide a method of making a plurality of flow elements arranged in series with gaps therebetween having pressure taps to a differential pressure measuring instrument with this construction having the advantage of impact or turbulence reduction, pressure averaging, and/or increased porosity to minimize velocity change into or out of one of the flow elements.

A further object of the present invention is to provide a method of manufacturing a flow element with permanent mechanical rigidity, geometric integrity of form, generally uniformly sized and unobstructed passageways, maximum porosity, and/or many parallel passageways each with small hydraulic diameter to assure laminar flow.

A further object of the present invention is to provide a method of making a structure comprising a flow element characterized by its mechanical permanence, geometric integrity, permanent rigidity, permanence of calibration, easily cleaned and handled construction without change of calibration, laminar flow characteristic, minimum reduction in flow area while providing laminar flow, inexpensive manufacturing cost, ease of assembly, structural simplicity, strong and sturdy nature, ease of operation or use, and/or low operating cost.

Other objects and advantages of this invention will be apparent from the accompanying drawings and description and the essential features will be set forth in the appended claims.

In the drawings,
FIG. 1 is a longitudinal sectional view through one form of fluid characteristic measuring intrument with the hereinafter described flow metering element therein;
FIG. 2 is a longitudinal sectional view through another form of fluid characteristic measuring instrument with an exterior view of the flow metering element therein;
FIG. 3 is a longitudinal sectional view through a third form of the fluid flow characteristic measuring instrument with the flow metering elements shown in side elevational view, being modular in form, and arranged in series;
FIG. 4 is a side elevational view of the flow metering element shown in FIGS. 1, 2 and 3;
FIG. 5 is an end view of the flow metering element in FIG. 4 with the size of the passageways and spaces in the helix enlarged for clarity of illustration;
FIG. 6 is an enlargement of the peripheral portion of the helix in FIG. 5;
FIG. 7 is a perspective view of two sheets before spiral winding into the element in FIG. 5;
FIG. 8 is a vertical sectional view taken along any of the lines 8—8 in FIGS. 1, 2 and 3;
FIG. 9 is schematic side elevational view of a vibrator with a flat vibrator plate therein supporting the flow element herein during the manufacture of the flow element; while
FIG. 10 is a vertical sectional, schematic view of a brazing furnace having therein the flow element during flow element manufacture.

Before the apparatus and method here illustrated and described is specifically described, it is to be understood that the invention here involved is not limited to the structural details, method steps, or arrangement of parts here shown since an apparatus or method embodying the present invention may take various forms. It also is to be understood that the phraseology or terminology herein employed is for purposes of description and not of limitation since the scope of the present invention is denoted by the appended claims.

Those familiar with this art will recognize that the present invention may be applied in many ways, but it has been chosen to illustrate the same as an instrument for measuring a characteristic of a flowing fluid. The herein described characteristic is that of a gas but it should be readily understood that any of the instruments described herein may be used: (1) to measure the characteristic of any suitable fluid, either gas or liquid, under many conditions, and (2) to measure other characteristics of a flowing fluid besides flow or velocity, such as viscosity of the flowing fluid, temperature change, pressure drop, etc. Also some aspects of the disclosed invention may be useable with other flow metering elements of passageway or orifice type instead of only elements 10 disclosed herein.

FIGS. 1, 2 and 3 disclose three different forms of instruments utilizing one or more flow metering elements 10. Each includes housing 20, 30 or 40 having cylindrical sleeve 20b, 30b or 40b respectively having bore 20a, 30a or 40a through which fluid flows in fluid flow direction 12 with the instruments adapted for measuring a characteristic of this flowing fluid. In FIG. 1, two end adapters 22 are detachably screwed into opposite ends of sleeve 20b and are detachably connected by threads to inlet pipe 23 and outlet pipe 24. In FIGS. 2 and 3, housings 30 and 40 respectively have inner sleeves 30b and 40b supported by one or more solid, annular adapter rings 30g and 40g within cylindrical outer sleeves 30h and 40h preventing fluid flow between sleeves 30b, 30h and 40b, 40h.

In each instrument, any suitable pressure differential measuring instrument may be used, such as manometer 14 containing any suitable manometer liquid 13 and connected to upstream tap 15 and downstream tap 16 from bore 20a, 30a or 40a. Each of these taps includes adapter sleeve 17 welded to the outer surface of housing 20, 30 or 40; and bore 20t, 30t or 40t through housing sleeve 20b, 30h or 40h into bore 20a, 30a or 40a. Fitting 18 is screwed into each adapter sleeve 17. Suitable flexible tube 19 is telescoped over each fitting 18 and leg of manometer 14 so that fluid pressure from each tap 15 or 16 will be directed against the surface of manometer liquid 13 in each manometer leg. Although sleeve 17 and fitting 18 may be used alone without the parts shown in FIG. 8 therein to obtain some advantages of the invention, it is preferred that they include the parts shown as gland helical spring 80, ring-like gland 81, O-ring 82, and pulsation dampening plug or member 83 of any suitable porous material. It should be apparent that plug 83 is also useable in other type pressure measure instruments.

In FIGS. 1, 2 and 3, the flow metering elements 10 extend across the bores 20a, 30a and 40a. One element 10 in FIGS. 1 and 2 and three elements 10 in FIG. 3 are located along the flow direction 12 between taps 15 and 16. As will be apparent hereinafter, element 10 has a plurality of fluid flow passageways 10a extending through this flow element in the flow direction 12 with each passageway having a hydraulic diameter sufficiently small for assuring laminar flow of the fluid within the range of operation of the element.

Fluid flow may be either laminar or turbulent flow. Laminar flow is characterized by fluid flow with a Reynolds number below 2000. The important difference between laminar and turbulent flow is that for laminar flow the differential pressure is linearly related to the velocity or fluid flow volume of the flowing fluid, whereas, for turbulent flow the differential pressure is related to the square of the velocity or fluid flow volume of the flowing fluid.

Hence, the differential pressure of the flow at turbulent velocity in housing bore 20a, 30a or 40a in FIGS. 1, 2 and 3 with elements 10 omitted would be the same as the flow through any single flow orifice so as to be related to the square of the velocity or fluid flow volume of the flowing fluid because turbulent flow would be existing. When elements 10 are inserted, the many passageways 10a in FIG. 5 in each flow element or elements 10 convert the turbulent flow in each housing bore into laminar flow for measuring purposes. Then, as long as the flow through elements 10 in FIGS. 1, 2 and 3 in the direction of flow 12 is laminar, the differential pressures measured on manometers 14 will be linearly related, directed related, or proportionally related to the velocities or fluid flow volumes.

Element 10 depends for its principles of operation on capillary flow. This may be stated as a mathematical law, known as Poisseuille's law, which relates the volume of fluid flow through a capillary tube to the differential pressure, the diameter of the tube, the length of the tube, and the absolute viscosity of the flowing fluid. This law may be expressed as:

$$Q = \frac{KPD^4}{vL}$$

where Q is the volume flow, K is the constant dependent on units, P is the differential pressure, v is the absolute viscosity, D is the hydraulic diameter, and L is the length of capillary passageway. This equation is valid only: (1) for laminar flows, namely flows having Reynolds numbers below 2000, and (2) for design configurations in which there is no velocity change into or out of the capillary section. Reynolds number is a dimensionless parameter of fluid flow used as a yardstick to determine if the state of the flowing fluid is laminar or turbulent. Reynolds number may be expressed by the mathematical equation:

$$Nr = \frac{DVd}{v}$$

where $Nr$ is the Reynolds number, D is the hydraulic diameter, V is the velocity of the flowing fluid, $d$ is the density of the fluid, and $v$ is the absolute viscosity. Although the flow in flow direction 12 in bore 20a, 30a or 40a may be turbulent without an element 10 therein, installation of element 10 will cause laminar flow. The large diametrical size of any of the bores 20a, 30a or 40a without an element 10 therein will be sufficiently large in diameter that the Reynolds number may be above 2000 so turbulent flow will exist. Installing an element 10 will create laminar flow because the element provides many pasageways 10a, each of which has a uniform hydraulic diameter as small as practical. It is this reduction in diameter of flow passageways which brings the Reynolds number below 2000 and creates laminar flow in passageways 10a. Laminar flow is characterized by streamlines of flowing fluid in the passageways 10a and a parabolic distribution of velocity across each passageway. Actually, in laminar flow the first lamina or layer of fluid next to the wall of each passageway does not move so that any roughness, dirt or corrosion thereon does not affect the relationship except as they alter the cross sectional flow area. In contrast, in turbulent flow there are cross-currents and intermixing of the flow streams with a resulting scrubbing action on the walls of the pipe which allows pipe roughness to interfere with the flow and affect the flow relationships measured by manometer 14.

Element 10 is shown in detail in FIGS. 4, 5 and 6.

Although element 10 may be manufactured in any suitable manner, a preferred method of making this laminar flow element 10 include one or more of the numbered steps described hereinafter.

First, two sheets 50 and 52 are selected with each being of substantially uniform width dimension 51 and being made of any suitable material with each of these sheets being planar in form, as shown by sheet 50 in FIG. 7, at this stage of manufacture. It has been found that satisfactory results are obtained when each sheet is a thin sheet of metallic material, such as 302 stainless steel, having a full temper of maximum hardness (about 42 Rockwell C in the as-rolled condition) so as to be easier to handle, to form, and to get the end results even though each sheet may be very thin. A thickness dimension of not substantially greater than 0.001 inch has been found to give satisifactory results, as will be more apparent hereinafter.

Second, sheet 52, being of planar form like sheet 50 in FIG. 7, is now uniformly corrugated so sheets 50 and 52 have the appearance shown in FIG. 7. This sheet 52 is run through crimping rolls or dies with the straight line, generating elements 52a of the corrugations extending parallel to each other, to the flow direction 12 in FIGS. 1–3, and to the longitudinal axis 10d and axis 10 of the spiral in the finished element 10 in FIGS. 4 and 5. Each corrugation has peak 52c and valley 52b.

Third, sheets 50 and 52 are superimposed in contact so that the width dimension 51 in FIG. 7 generally coincide and the lengths of the sheets 50 and 52 are substantially the same so that the sheets are substantially coextensive. It should be noted that this width dimension 51 in FIG. 7 becomes the length dimension 51 of the element 10 in FIG. 4.

Fourth, the superimposed sheets 50 and 52 are spirally wound with generally uniform tension about metallic core 54 into the form shown in FIG. 5 with the generating elements 52a of the corrugations extending parallel to the axis 10d of this spiral. Then, most of the portions of corrugated sheet 52 are sandwiched between portions of sheet 50, as shown in FIG. 6, with corrugation peak 52c and valley 52b generally in contact with sheet 50.

Fifth, helically wound sheets 50 and 52 are telescopically inserted with core 54 into cylindrical sleeve cover or shell 56 made of suitable metallic material. The rigid, cylindrical bore of metallic casing 56 retains sheets 50 and 52 in the spirally wound condition in spite of the full temper of the material of these sheets tending to straighten them to the form shown in FIG. 7. The interlocking spiral shape of sheets 50 and 52 in FIG. 5 provides a plurality of element wall portions 10c by sheets 50 and 52 defining many small flow passageways 10a with each located between a corrugation of sheet 52 and a portion of the sheet 50. The cylindrical shell 56 serves to connect these wall portions 10c together in the form shown in FIG. 5.

Sixth, it may be desirable under some circumstances to vibrate the assembly shown in FIG. 5 so as to align the sheets 50 and 52 and control the shape of the flow passageways 10a therebetween. If one spiral face, such as element end 10b, is placed downwardly on a vertically vibrating flat plate 91 (shown schematically in FIG. 9) of any suitable type driven by any suitable vibrator 92 (shown schematically in FIG. 9), the vertically vibrating plate 91 will vibrate the flow element along the axis 10d of the spiral so as: (1) make all the width dimensions 51 in FIG. 7 of sheets 50 and 52 laterally coincide so that element 10 will be of uniform length 51 with the end faces thereof, such as end 10b, each planar and parallel to each other, and (2) equalize by the vibration any strain developed during winding of the sheets into the spiral so that the passageways 10a will be of substantially uniform size.

Seventh, the components of element 10 are given mechanical permanence of form by suitable connecting means connecting these wall portions 10c together. Here, each corrugation peak 52c and each corrugation valley 52b of sheet 52, or at least as many as possible, is secured at contact 58 to plate 50 and the surface of core 54 and/or shell 56; and sheet 50 is secured at contact 58 to the surface of core 54 and/or shell 56. This securing or joining is by metallic heat fusion at contact by heating the assembly in a furnace in any suitable manner.

Here are two alternative methods of metallic heat fusion. First, brazing may be used to provide the joining by heat fusion. Then, a suitable brazing material is applied to sheets 50 and 52 at any desirable stage in manufacture, and then the assembly in FIG. 5 may be heated in a suitable hydrogen atmosphere brazing furnace 94, shown schematically in FIG. 10, to a brazing temperature for sufficient time for causing fusion to join together the component parts at contacts 58. Satisfactory results have been obtained with a conventional brazing compound with heating four hours at a temperature of 2000° F. To be sure that the brazing material does not clog the small passageways 10a, it is desirable that axis 10d be located vertically during heating, as shown in FIG. 10, so that the brazing material will run, if any flow takes place, longitudinally of these flow passageways. Second, another method of metallic heat fusion assures a clean bond at contacts 58 with no chance of blocking the flow passageways 10a. Here, the surfaces of sheets 50 and 52, core 54 and shell 56 are cleaned before assembly, and then the assembly in FIG. 5 is heated in a furnace, preferably a hydrogen atmosphere furnace, to near the melting point of the material of at least one of the sheets, so that the material is fused with molecular fusion occurring to form the bond at contacts 58. This temperature is the eutectic point of the material. Sheets 50 and 52, core 54 and shell 56 are preferably made of the same material, such as 302 stainless steel, so all will fuse together. Then, this temperature may be about 2250° F. for these sheets, core and shell. This second fusion method and this last described construction are the preferred form. The dew point for the hydrogen atmosphere should be minus 40° F.

In either of the two metallic heat fusing methods mentioned in the preceding paragraph, certain advantages are obtained. The completed element 10 has many advantages desirable in a flow metering element, as will be readily apparent from the description herein. First, this heat fusion provides an intermolecular and intermetallic bond by heat fusing together sheets 50 and 52, core 54, and shell 56 to provide a single, mechanically rigid, geometric structure forevermore maintaining dimensional integrity and permanence of form. Second, since securement between the component parts is at contacts 58, each passageway 10a is unobstructed and not partially or completely blocked by any securing means for these sheets 50 and 52. Hence, laminar flow will exist in each flow passageway and no partial obstruction exists in any passageways to increase the velocity to the turbulent flow range to affect the measuring by manometer 14. Third, heating of the assembly in FIG. 5 not only fuses and joins the components thereof at contacts 58 but also relieves stresses by annealing so as to relieve the stresses caused by the full temper of sheets 50 and 52 and by the step of spirally winding these sheets. This stress relieving more readily assures mechanical structural permanence of form and uniform size of each flow passageway 10a, so as to assure that the metering element 10 will maintain its calibration and that laminar flow will exist in each flow passageway. It should be noted that the vibration in the aforementioned sixth step also relieves stresses to provide some of these advantages.

Now, it should be apparent that each passageway 10a of element 10 has a substantially equal hydraulic diameter, has dimensional rigidity, and is substantially unobstructed so that the metering calibration of element 10 is maintained and laminar flow will take place in each passageway. The equal sizes of the passageways are assured by the unform corrugations formed in sheet 52, the substantially uniform tension used during winding the helix, and the annealing or stress relieving by heat. Also, the thinness of each sheet 50 or 52, as shown by dimension 60 in FIG. 6, increases the porosity of element 10 and permits the use of a small hydraulic radius for each passageway 10a. Therefore, element 10 meets both conditions previously mentioned as being required for the formula under Poisseuille's law. These conditions are that the flow is in the laminar flow range, and that the structural configuration is such that there is substantially no velocity change into or out of the capillary sections provided by passageways 10a. In other words, the thinness of dimension 60 approaches zero toward the desired 100 percent porosity. As mentioned before, the full temper permits these thin sheets to be properly handled in manufacture, crimped, and spirally wound. Element 10 with the following dimensions has been found to give desirable results. Each passageway 10a in FIG. 6 is generally triangular in cross section with each altitude 61 of each equilateral triangle no greater than 0.020 inch and preferably as small as 0.012 inch, and with the thickness dimension 60 of each wall portion 10c being less than 0.0015 inch and as small as 0.0005 inch if possible but preferably not substantially greater than 0.001 inch.

Although the preferred form has been described, it should be readily apparent that variations in structure come within the scope of the invention although all of the advantages mentioned heretofore may not be obtained. First, the components of element 10 may not be fused at all contact points 58 but at a sufficient number to give a mechanical permanence of form. Second, sheets 50 and 52 may not be fused to both core 54 and shell 56 if so desired.

Now, it should be readily apparent that the instruments in FIGS. 1, 2 and 3 will each measure the velocity or flow volume of the fluid moving in flow direction 12 as a linear relationship of the pressure drop across one or more of these elements 10 with this differential pressure indicated by the vertical dimension 64 between the tops of the legs in manometer 14. These instruments will measure properly as long as laminar flow exists in elements 10.

The construction of flow elements 10 readily lend them to modular construction and arrangement. These elements 10 may be arranged in series or in parallel to increase instrument readability or increase volume flow if so desired. In either series or parallel, at least one half the fluid flow will go through each of the elements to change the calibration of the instrument. For example, three elements 10 are arranged in series in FIG. 10 between taps 15 and 16 with sleeve 40b being of sufficient length so that all three of these elements are connected in series in its bore 40a. If only one element 10 is located in bore 40a, a typical installation might provide a one inch differential height dimension 64 of liquid 13 in manometer 14 for one cubic foot per minute of air flowing in direction 12 with this single element 10 providing one square inch of flow area and being three inches long in axial dimension. Then, if three elements 10 were arranged in series, as shown in FIG. 3, the assembly is lengthened to nine inches, and one cubic foot per minute of air will cause differential pressure dimension 64 to be three inches. If two of these elements were used and arranged in parallel instead of series, the flow area would be increased to two square inches so that two cubic feet per minute of air would cause differential pressure dimension 64 to be one inch. Hence, the linear relationship still is maintained.

In some installations, the FIG. 1 construction may be desirable. FIG. 1 discloses two other flow elements 70 and 71 of the same cross sectional passageway construction (as seen in FIG. 5) as the aforedescribed flow element 10 with these other flow elements 70 and 71 straddling element 10 in flow direction 12 with taps 15 and 16 in fluid communication with the spaces 72 and 73 between each adjacent pair of these elements 10, 70 and 10, 71. Upstream element 70 is located on the opposite side of tap 15 from element 10, and downstream element 71 is located on the opposite side of tap 16 from element 10. This construction has several advantages including: (1) reducing the velocity affects of the fluid stream entering and leaving element 10 so as to provide a more linear calibration by assuring laminar flow in element 10, (2) reducing extreme turbulence, (3) assuring that no upstream or downstream run of pipe is required to assure laminar flow because impact reducers 70 and 71 permit element 10 to be connected directly in a line to an elbow or other abrupt pipe fitting, (4) providing in each space 72 or 73 a pressure averaging function by single tap 15 or 16 instead of requiring a plurality of circumferentially arranged taps required in a ring piezometer for pressure averaging, and (5) minimizing the fluid velocity change into and out of element 10 by forcing the fluid to assume generally the same path of travel through elements 70 and 71 as it takes through element 10 so as to satisfy the aforementioned second condition for making Poisseuille's law and formula valid by minimizing the velocity change into and out of element 10 and by minimizing any lack of 100 percent porosity in element 10. Elements 70 and 71 may be of shorter axial length, as shown in FIG. 1, while still having the same cross sectional shape shown in FIG. 5. Although the axial length dimension 75 in FIG. 1 of either space 72 or 73 may be of any suitable length, the best results are obtained when this distance 75 along flow direction 12 in fluid communication with tap 15 or 16 is not substantially greater than, and preferably being approximately equal to, the hydraulic radius of each flow passageway 10a. Then, each space 72 and 73 will assure proper averaging of the pressure and laminar flow. In some installations, both elements 70 and 71 may not be needed. For example, downstream element 71 could be eliminated where there is no disturbance downstream from element 10, such as bore 20a has a long run downstream from element 10.

Here are some of the advantages of the use of element 10:

First, with laminar flow, a linear relationship exists between differential pressure and the flow volume or velocity.

Second, element 10 will operate over a larger flow ratio that a sharp edges orifice with no loss in readability. For example, element 10 may be used over a flow ratio of 10:1 while an orifice is generally considered to be applicable only over a flow ratio of 3:1.

Third, element 10 has several outstanding features especially adapting it for use in a flow measuring instrument. Element 10 has built in permanent mechanical rigidity and geometric integrity of form so that the calibration of element 10 remains constant for instrument accuracy, and laminar flow is always assured because the components of element 10 do not change their relative positions and the flow passageways 10a do not change sizes during cleaning or handling. Element 10 obtains its mechanical rigidity and geometric integrity by its single, fused, mechanical construction instead of depending on friction, mechanical assembly, or other types of fabrication which may permit relative movement of the components during handling. Each flow passageway 10a is of uniform size and is unobstructed so that element 10 has throughout its flow range laminar flow and a constant calibration. Wall portions 10c have a thickness dimension 60 in FIG. 6 of minimum size so as to increase porosity of element 10 and to minimize velocity change into and out of each of the capillary sections or passageways 10a of element 10. Also, the hydraulic diameter of each passageway 10a is of minimum size so that the Reynolds number will still remain in the laminar flow range at higher flow velocities. Hence, the illustrated construction assures that laminar flow will take place with the Reynolds number below 2000 even though the velocity of flow is high because the hydraulic diameter is small, and assures that the aforementioned two conditions are met so that the formula in Poisseuille's law will apply.

Fourth, laminar flow element 10 is considerably less affected by pulsations in the flowing fluid than orifice plates or other metering devices which work on a square-root curve. If manometer 14 is well damped, it will indicate the arithmetic average of pressure pulsations, and especially when the pulsations are rapid with respect to the time constant of the manometer. An orifice requires a root-mean-square average of the differential pressure pulsations to give a true indication of average flow. Only complex, electronic, differential pressure measuring instruments can be adjusted to give a root-mean-square average of pulsating differential pressure. Laminar flow element 10 requires manometer 14 to indicate the arithmetic average of the pressure pulsations. Hence, element 10 lends itself particularly well to pulsating flow application, and generally a true average flow will be indicated by the combination of an element 10 and a well damped liquid column manometer 14, as shown in FIGS. 1, 2 or 3. Good dampening or attenuation of the pulsations is obtained by pulsation dampening plugs 83 in FIG. 8 in both taps 15 and 16 with this attenuation being viscous in nature. Each plug 83 is preferably a sintered bronze plug with 500 mesh or smaller opening size and with sufficient axial length to provide desired viscous attenuation of any pressure pulsations. Sintered bronze has the advantage over felt material of providing controlled and uniform porosity to provide uniform dampening.

Fifth, elements 10 are easily removed from bore 20a, 30a or 40a; easily cleaned; and easily maintained. Cleaning is desirable because the passageways 10a are small and may become partially clogged during use.

Sixth, calibration of element 10 is unaffected by changes in absolute pressure of the flowing fluid because of the linear relationship. However, although the volume of flow will remain the same, a difference of the fluid will mean that a difference in fluid weight is flowing.

Seventh, the flow of gas through element 10 is affected in a predictable way (desirable in a measuring instrument) by the temperature of the flowing gas. Gases, unlike liquids, show an increase in absolute viscosity with an increase in gas temperature. The differential pressure for a given volume of flow will increase under the formula in Poisseuille's law as the viscosity of the flowing gas increases. Therefore, for a constant differential pressure, the flow through element 10 will decrease as the temperature of the flowing gas increases. Hence, temperature correction curves can be provided for elements 10 with the characteristics of the curves being identical.

Eighth, element 10 may be used in a direct reading viscometer. Then, laminar flow element 10 is connected in series with a sharp edged orifice through both of which flows the fluid in flow direction 12. The orifice, unlike the laminar flow element 10, is unaffected by viscosity. At a pre-set flow condition, which is a pre-set differential pressure across the orifice, the differential pressure across the laminar flow element 10 is a direct measure of the viscosity of the flowing gas. Although this structure is not illustrated in the drawings, it should be readily apparent to one skilled in the art.

Various changes in details and arrangement of parts can be made by one skilled in the art without departing from either the spirit of this invention or the scope of the appended claims.

What is claimed is:

1. A method of making a laminar flow element, comprising superimposing in contact two substantially coextensive sheets of metal comprising a first sheet of planar metal and a second sheet of uniformly corrugated metal, spirally winding said superimposed sheets into a laminar flow element with the generating elements of the corrugations extending parallel to each other and to the axis of said spiral with a flow pasageway located between each corrugation and said first sheet, holding said sheets in spiral wound condition against substantial unwinding of the spiral during the vibration step hereafter, placing one spiral face of said flow element on a vibrating plate for vibrating said flow element along the axis of said spiral for axially aligning said sheets and for controlling the shape of said flow passageways by movement between said sheets on the peaks and valleys of the corrugations, axially aligning said sheets and controlling the shape of the passageways of the flow element by vibrating said flow element along the axis of said spiral to cause relative movement between said sheets on the peaks and valleys of the corrugations, and bonding said sheets together to give said flow passageways thereof substantially equal size and dimensional rigidity.

2. A method of making a laminar flow element, comprising uniformly corrugating one sheet by a crimping roll, superimposing in contact another sheet substantially coextensive with said one sheet of material to provide a first sheet of planar material and a second sheet of uniformly corrugated material having uniformly shaped and spaced corrugations, spirally winding said superimposed sheets by a uniform winding tension into a laminar flow element with the generating elements of the corrugations extending parallel to each other and to the axis of said spiral with a flow passageway located between each corrugation and said first sheet, and securing the corrugation peaks and valleys of said second sheet at contact to said first sheet to give said flow element its spiral shape and each flow passageway thereof dimensional rigidity with each flow passageway being of substantially equal hydraulic diameter and being substantially unobstructed, said sheets being of the same metallic material, said securing step comprising joining by heat fusion the corrugation peaks and valleys at contact to said first sheet by heating said flow element in a furnace to at least the eutectic temperature near the melting point of the material so as to fuse the material of said sheets at said contacts by molecular fusion of only the material in said sheets to give said flow element its spiral shape and each flow passageway thereof dimensional rigidity with each flow passageway being of substantially equal hydraulic diameter and being substantially unobstructed.

3. A method of making a laminar flow element, comprising superimposing in contact two substantially coextensive full temper thin sheets of metallic material comprising a first sheet of planar material and a second sheet of uniformly corrugated material having uniformly shaped and spaced corrugations, spirally winding said superimposed sheets by a uniform winding tension into a laminar flow element with the generating elements of the corrugations extending parallel to each other and to the axis of said spiral with a flow passageway located between each corrugation and said first sheet, telescopically assembling said sheets into a rigid cylindrical bore of a metallic casing, permitting said spiral sheets to expand to fill uniformly said bore, placing one spiral face of said flow element on a vibrating plate for vibrating said flow element along the axis of said spiral for axially aligning said sheets and for controlling the shape of said flow passageways by movement between said sheets on the peaks and valleys of the corrugations, axially aligning said sheets and controlling the shape of the passageways of the flow element by vibrating said flow element along the axis of said spiral, and heating said flow element to relieve the stresses in the corrugations radially and circumferentially of said spiral and in said spirally wound sheet and to secure by heat fusion said sheets to said casing and to secure by heat fusion substantially all of the corrugation peaks and valleys of said second sheet at contact to said first sheet by heating said flow element in a furnace to give said flow element its spiral shape and each flow passageway thereof dimensional rigidity with each flow passageway being of substantially equal hydraulic diameter and being substantially unobstructed.

4. A method of making a laminar flow element, as set forth in claim 3, with the step of selecting as the metallic material in both of said sheets full temper thin sheets of steel, whereby corrugations are easily formed in said second sheet, said sheets are easily spirally wound, are extremely thin so that the flow element approaches the desired 100% porosity, permit use of small hydraulic radii, and have dimensional stability; and the step of uniformly corrugating said second sheet by a crimping roll before superimposing said sheets.

References Cited in the file of this patent

UNITED STATES PATENTS

| | | |
|---|---|---|
| 1,759,239 | Morrison | May 20, 1930 |
| 1,806,738 | Burns et al. | May 26, 1931 |
| 1,913,860 | Spink | June 13, 1933 |
| 2,212,186 | Ricardo et al. | Aug. 20, 1940 |
| 2,445,766 | Derby et al. | July 27, 1948 |
| 2,457,420 | Veeder | Dec. 28, 1948 |
| 2,721,952 | Kenyon | Oct. 25, 1955 |
| 2,752,672 | Tolman | July 3, 1956 |
| 2,768,431 | Hughes | Oct. 30, 1956 |
| 2,824,364 | Bovenkerk | Feb. 25, 1958 |
| 2,833,027 | Foster | May 6, 1958 |
| 2,890,885 | Harvey | June 16, 1959 |
| 2,944,504 | Herman et al. | July 12, 1960 |

FOREIGN PATENTS

| | | |
|---|---|---|
| 9,228 | Great Britain | 1911 |

UNITED STATES PATENT OFFICE
CERTIFICATE OF CORRECTION

Patent No. 3,123,900 March 10, 1964

Gordon H. Millar

It is hereby certified that error appears in the above numbered patent requiring correction and that the said Letters Patent should read as corrected below.

In the grant (only), line 1, for "Gordon H. Miller" read -- Gordon H. Millar --; in the grant, lines 2 and 12, and in the heading to the printed specification, line 5, for "Instruments", each occurrence, read -- Instrument --; column 3, line 43, for "directed" read -- directly --; column 4, line 49, for "axis 10" read -- axis 10d --; column 8, line 66, after "difference" insert -- in density --.

Signed and sealed this 21st day of July 1964.

(SEAL)

Attest:

ESTON G. JOHNSON
Attesting Officer

EDWARD J. BRENNER
Commissioner of Patents